(12) United States Patent
Elwell et al.

(10) Patent No.: US 6,216,196 B1
(45) Date of Patent: Apr. 10, 2001

(54) SYSTEM AND METHOD FOR MULTIPLE DEVICE DRIVERS TO ARBITRATE FOR A SINGLE DEVICE

(75) Inventors: Don Elwell, Perrineville; James Sienicki, Cranbury; Christopher Zimmermann, Monmouth Junction, all of NJ (US)

(73) Assignee: Ariel Corporation, Cranbury, NJ (US)

( * ) Notice: Subject to any disclaimer, the term of this patent is extended or adjusted under 35 U.S.C. 154(b) by 0 days.

(21) Appl. No.: 09/312,732

(22) Filed: May 14, 1999

(51) Int. Cl.⁷ .............................. G06F 13/00; G06F 13/14
(52) U.S. Cl. ............................... 710/240; 709/301
(58) Field of Search .................... 710/36, 72, 129, 710/5, 240, 241, 62, 63, 100, 104, 200; 709/301, 302, 253; 707/104

(56) References Cited

U.S. PATENT DOCUMENTS

| | | |
|---|---|---|
| 5,664,095 | * 9/1997 | Cox et al. . |
| 5,915,131 | * 6/1999 | Knight et al. . |
| 5,922,034 | * 7/1999 | Feely . |
| 6,078,970 | * 6/2000 | Nordstrom et al. . |

OTHER PUBLICATIONS

PCI Local Bus Specification, Revision 2.1, Chapter 6, PCI Special Interest Group Jun. 1, 1995, pp. 1–218.

* cited by examiner

*Primary Examiner*—Gopal C. Ray
(74) *Attorney, Agent, or Firm*—Kenyon & Kenyon (57) ABSTRACT

A computer system for controlling the operation of a multifunction device, including a central processing unit, a memory device connected to the central processing unit, a plurality of device drivers, wherein each of the plurality of device drivers issues commands to control the multifunction device and an arbitration mechanism connected to the plurality of device drivers and further connected to the multifunction device, wherein commands issued by the plurality of device drivers are received by the arbitration mechanism, and wherein the arbitration mechanism determines a sequence for the commands to be issued to the multifunction device.

26 Claims, 5 Drawing Sheets

SYSTEM AND METHOD FOR MULTIPLE DEVICE DRIVERS TO ARBITRATE FOR A SINGLE DEVICE

FIELD OF THE INVENTION

The present invention is directed to a system and method to arbitrate control commands issued by multiple device drivers to a single multifunction device, thereby preventing conflicting control commands from degrading the performance of the multifunction device.

BACKGROUND INFORMATION

Device drivers are commonly used in computer systems as the lowest level software component to communicate with hardware devices. Typically, these device drivers are associated with the devices they control in a one-to-one relationship. For example, a serial port driver is associated with the data/fax modem of the computer, an Integrated Switched Digital Network (ISDN) driver is associated with the ISDN interface device, and yet another driver provides the interface to a Wide Area Network (WAN) data interface device. In such an arrangement, each dedicated driver performs the start-up, shutdown, maintenance, and functional operations for the hardware device.

Due to advances in technology, it has become possible to integrate several hardware devices into a single multifunction device. For example, a single hardware device may be capable of performing one or all of the functions of a data/fax modem, ISDN, and WAN interface. Such multifunction devices have several advantages over multiple single function devices, including reduced cost, smaller size, reduced load on the host system and easier installation. However, to remain compatible with legacy applications these multifunction devices still require dedicated drivers for each function, e.g., serial port, ISDN, WAN, etc. It is preferable to keep each device driver functioning independently which results in multiple device drivers sending commands to the single hardware device. Thus, there exists the possibility that the commands sent by one driver may conflict with the commands sent by another driver, resulting in a system malfunction. For example, one driver may send a command to shutdown the hardware device while other independent drivers are using the device. Another example is where one driver attempts to run a diagnostic test that requires exclusive access to the multifunction device to ensure valid results, and another driver attempts to access the multifunction device during this diagnostic test. There are numerous conflicts that can occur with multiple device drivers accessing a single multifunction hardware device.

Figure 1:
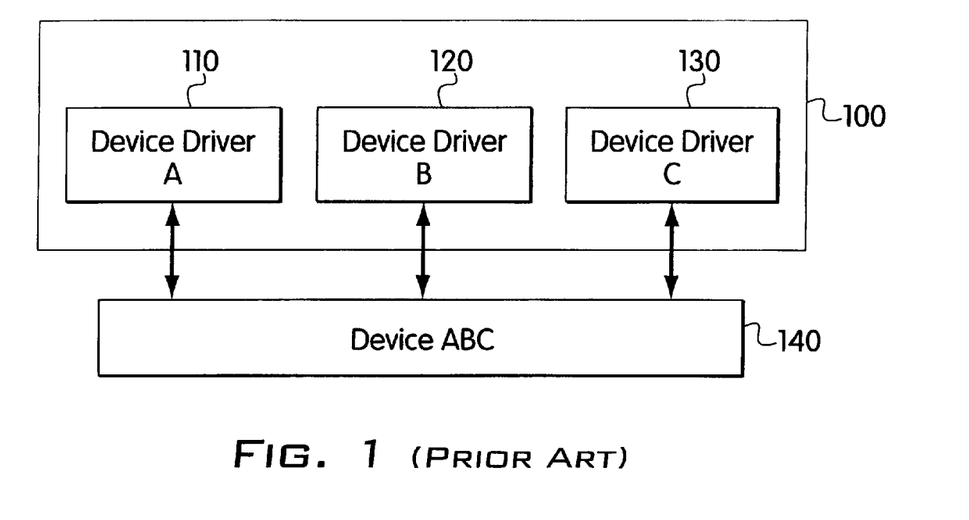
FIG. 1 shows a computer system having multiple device drivers and a multifunction device according to the prior art.

FIG. 1 illustrates an exemplary prior art computer system 100 having a plurality of device drivers, i.e., device driver A 110, device driver B 120, and device driver C 130 being connected to a multifunction device 140. In operation, computer system 100 may request a first function to be carried out by multifunction device 140. When a function is requested, computer system 100 directs the driver corresponding to the requested function to send commands to multifunction device 140 in order for it to perform the requested function. For example, if function A is requested, computer system 100 directs device driver A 110 to send commands to multifunction device is 140 to perform function A. However, as described above, some device drivers may issue conflicting commands to the multifunction device. Conflicting commands being sent from different drivers may result from numerous scenarios in a system with a multifunction device. For example, while multifunction device 140 is being directed to perform function A by device driver A 110, computer system 100 may direct device driver B 120 to issue commands to multifunction device 140 to perform function B. Part of the commands issued by device driver B 120 may be device initialization commands which conflict with the commands being issued by device driver A 110. In such cases, the multifunction device may not perform some or all of the requested functions because of the conflict.

One possible solution to this problem is to combine the device drivers into a single multifunction driver, and thereby prevent conflicting commands using programmatic methods. However, this approach may require that a large portion or all of the software code of the existing drivers be rewritten to be able to work as a single driver. This solution also reduces the modularity of the software. A single combined driver is larger and more complex, and therefore is more difficult to create, test, maintain, and upgrade. Combining multiple drivers into a single multifunction driver can increase the total number of drivers required, when all the different permutations and combinations of drivers and multifunction devices are considered. Thus, it is highly desirable to keep the drivers separate. In some systems, such as Microsoft NT™, it may not even possible to combine drivers together due to restrictions imposed by the NT™ operating system environment.

Figure 2:
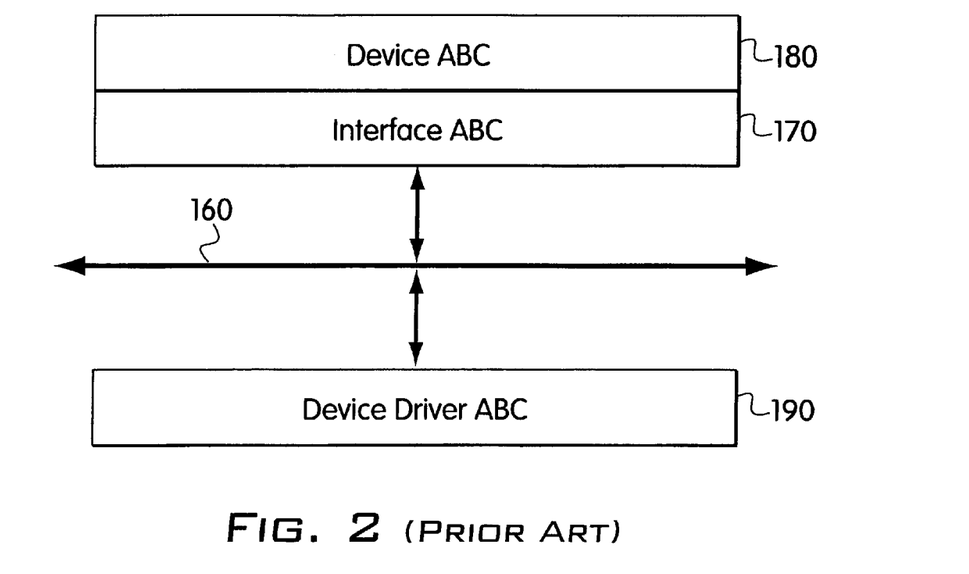
FIG. 2 shows a multifunction device connected to the host system bus architecture according to the prior art.

When a multifunction device is implemented into the host system's bus architecture, for example, the Peripheral Component Interconnect (PCI) architecture, in addition to the device drivers, an interface for the bus architecture may be required. Normally, when multiple devices are combined on a single hardware card, a separate interface is required for each device on the card. However, in some multifunction devices a single processor is used to perform the protocol processing for all devices, for example, a modem, PSTN, and WAN. This approach is advantageous because it reduces hardware costs and improves the efficiency of inter-device communications by passing information between the devices on the same board, instead of passing it through the host system. The conventional solution for such a multifunction device is to create a new interface for all the functions on the device. FIG. 2 illustrates an exemplary prior art multifunction device 180 having an interface 170 connected to the host system bus architecture 160. Additionally, an associated device driver 190 to drive the multifunction device is also created. As described above, the problem with this arrangement is that it does not keep each device driver separate. Such device drivers are difficult to create and support, host systems may not recognize these types of device drivers and the host system may not be capable of loading these device drivers because of conflicts they have with the way individual drivers are used in the host environment.

SUMMARY OF THE INVENTION

The present invention discloses an arbitration mechanism that arbitrates the control commands issued by multiple device drivers to a single multifunction device. The arbitration mechanism prevents the multifunction device from receiving conflicting commands by allowing an individual device driver to request exclusive access to the multifunction device. When a device driver requests exclusive access, the other device drivers finish any critical operations they have remaining with the multifunction device and discontinue accessing the multifunction device so that the requesting device driver may have a period of exclusivity with the multifunction device. When the period of exclusivity is over, each of the multiple device drivers may equally access the multifunction device, until another device driver requests exclusive access.

The arbitration mechanism of the present invention allows the device drivers for the multifunction device to be developed separately and only requires minimal changes to implement the mechanism into existing drivers. Thus, device driver software may maintain its modularity. The arbitration mechanism of the present invention is also extrinsic, meaning that it's implementation is independent of the function of the device drivers or devices. The arbitration mechanism of the present invention may be implemented either in hardware or software.

Additionally, the present invention provides a separate interface corresponding to each device driver type that the multifunction device can support. In this manner, the multifunction device appears to the host system as an individual device for each function that the multifunction device is capable of performing.

DETAILED DESCRIPTION

Figure 3:
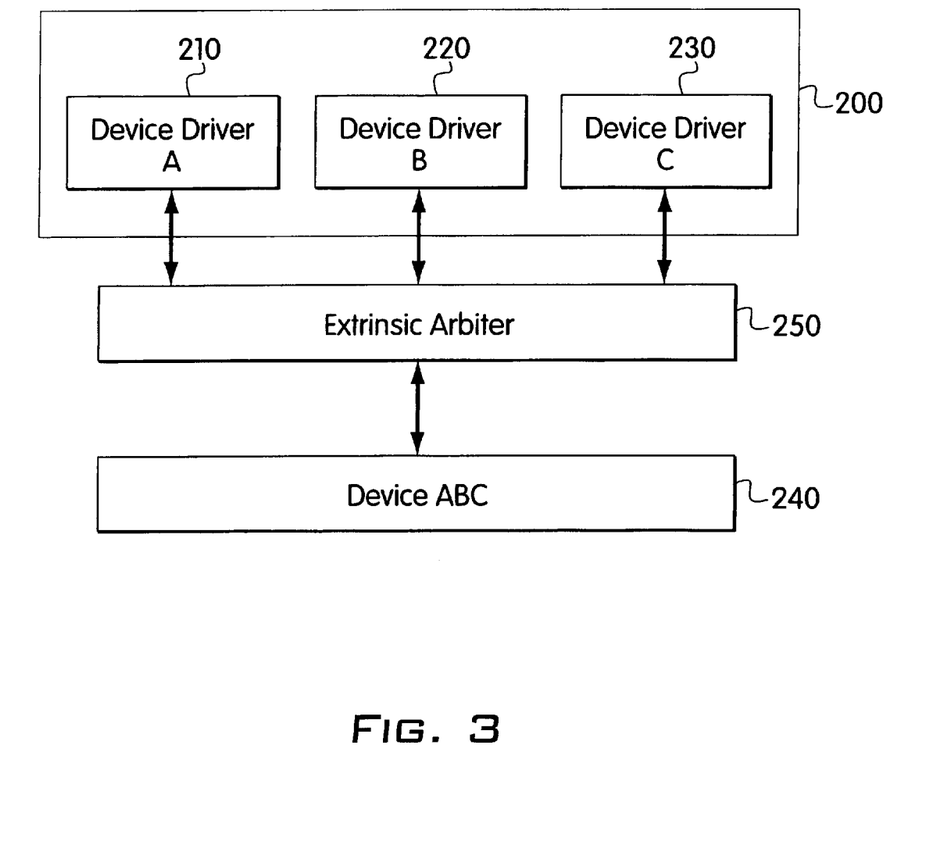
FIG. 3 shows an exemplary computer system having multiple device drivers, an extrinsic arbiter and a multifunction device according to the present invention.

Referring now to the drawings, and initially to FIG. 3, there is illustrated an exemplary computer system 200 having a plurality of device drivers, i.e., device driver A 210, device driver B 220, and device driver C 230, connected to multifunction device 240 through extrinsic arbiter 250. Although three device drivers are illustrated, the computer system 200 may include more or less drivers depending on the functional capability of the multifunction device 240. Additionally, multifunction device 240 may be contained in the same hardware case as computer system 200, for example, a card plugged into the bus architecture of a PC, or it may be a separate piece of hardware. Those skilled in the art will understand that computer system 200 may comprise numerous other hardware and software components not shown in FIG. 3.

In the present invention a device driver can be any software component or module that interfaces with a hardware device. Device driver A 210 may be, for example, a serial driver to allow multifunction device 240 to pass serial data to a modem. Device driver B 220 may be, for example, an ISDN interface driver to allow multifunction device 240 to originate and receive calls, and device driver C 230 may be, for example, a WAN driver to allow multifunction device 240 to send and receive data to a WAN network interface device. Another example of a multifunction device may be a Virtual Private Network (VPN) card that combines a WAN data interface, an X.25 data interface, and a data encryption processor. These device drivers may be very complex and, as previously stated, are best implemented as independent drivers. The above described multifunction devices and device drivers are only exemplary and the present invention can be applied to any multifunction device and the drivers used to interface with these devices. Those skilled in the art will understand that as technology advances more hardware functions will become available and it will become possible to combine numerous hardware functions into a single device, and due to the extrinsic property of the present invention it may be applied equally to these later developed multifunction devices and device drivers.

Extrinsic arbiter 250 is interposed between the device drivers 210, 220, 230 and the multifunction device 240 to provide an arbitration mechanism that can be used by each device driver to resolve device conflicts. This arbitration mechanism of the present invention is called extrinsic because it does not depend on any knowledge of the function being performed by the multifunction device and therefore, may be used by any type of device driver. The arbitration mechanism of extrinsic arbiter 250 can be applied to the device drivers of any multifunction device without any modification to extrinsic arbiter 250. For example, the same extrinsic arbiter 250 can be used whether the multifunction device 240 of FIG. 3 is a Modem/ISDN/WAN with its corresponding drivers, or is a WAN/X.25/Encryption device with its corresponding drivers. The arbitration mechanism uses rule based logic operating on system flags, described in more detail below, to regulate access to the multifunction device. Although extrinsic arbiter 250 is shown external to computer system 200 in FIG. 3, the extrinsic arbiter of the present invention may be implemented as either software or hardware in the existing computer system, the multifunction hardware device or an additional modular hardware platform.

In operation, computer system 200 may request a first function to be carried out by multifunction device 240. Such a request may be generated by computer system 200 for numerous reasons including, for example, a response to a user input or a software program. When a function is requested, computer system 200 directs the driver corresponding to the requested function to send signals comprising instructions or commands to multifunction device 240 in order for it to perform the requested function. For example, if function A is requested, computer system 200 directs device driver A 210 to send commands to multifunction device 240 to perform function A. However, as described above, multiple device drivers may issue conflicting commands to the multifunction device. Conflicting commands being sent from different drivers may result from numerous scenarios in a system with a multifunction device. For example, if multifunction device 240 is a Modem/ISDN/WAN communication device that is being directed to transmit a block of modem data by device driver A 210, computer system 200 may simultaneously direct device driver C 230 to issue commands to multifunction device 240 to modify the WAN interface. Part of the commands issued by device driver C 230 may be a device reset command which conflicts with the commands being issued by device driver A 210 which, without extrinsic arbiter 250, may cause the block of modem data to be lost. Once again, those skilled in the art will understand that there are various reasons for the issuance of conflicting commands by different device drivers and that the present invention is capable of arbitrating between the multiple device drivers to prevent all such device conflicts.

The arbitration mechanism of extrinsic arbiter 250 prevents such conflicts by operating in the following manner: a LOCK indicator or flag is assigned to the multifunction device, and one ACTIVE indicator or flag is assigned to each device driver. For example, in FIG. 3, multifunction device 240 is assigned a LOCK flag by extrinsic arbiter 250 and each of the device drivers 210, 220, 230 is assigned an ACTIVE flag. Each indicator or flag has two possible states, a set state and a clear state. A flag can be, for example, a hardware bit that returns a 1 value when the flag is set and a 0 value when the flag is cleared. Another example of a flag can be a boolean variable in software that is TRUE when the flag is set and FALSE when the flag is clear. The ACTIVE flag of a device driver is set when the device driver is using (or ready to use) the multifunction device and is cleared when the device driver is not ready to use the multifunction device or another device driver has exclusive use of the multifunction device. Each device driver may set or clear its ACTIVE flag and each device driver may read the ACTIVE flags of all device drivers to determine if they are set or clear. The purpose of one device driver reading the ACTIVE flags of other device drivers will be described in greater detail below. The LOCK flag of the multifunction device is set when one of the device drivers requires exclusive access to or control of the multifunction device and is cleared when the device driver requiring exclusive access or control releases the multifunction device for use by the other device drivers. When the LOCK flag is clear, any device driver may set the LOCK flag to signal that it requires exclusive access to the device. The LOCK flag may only be cleared by the device driver that set the LOCK flag.

Figure 4:
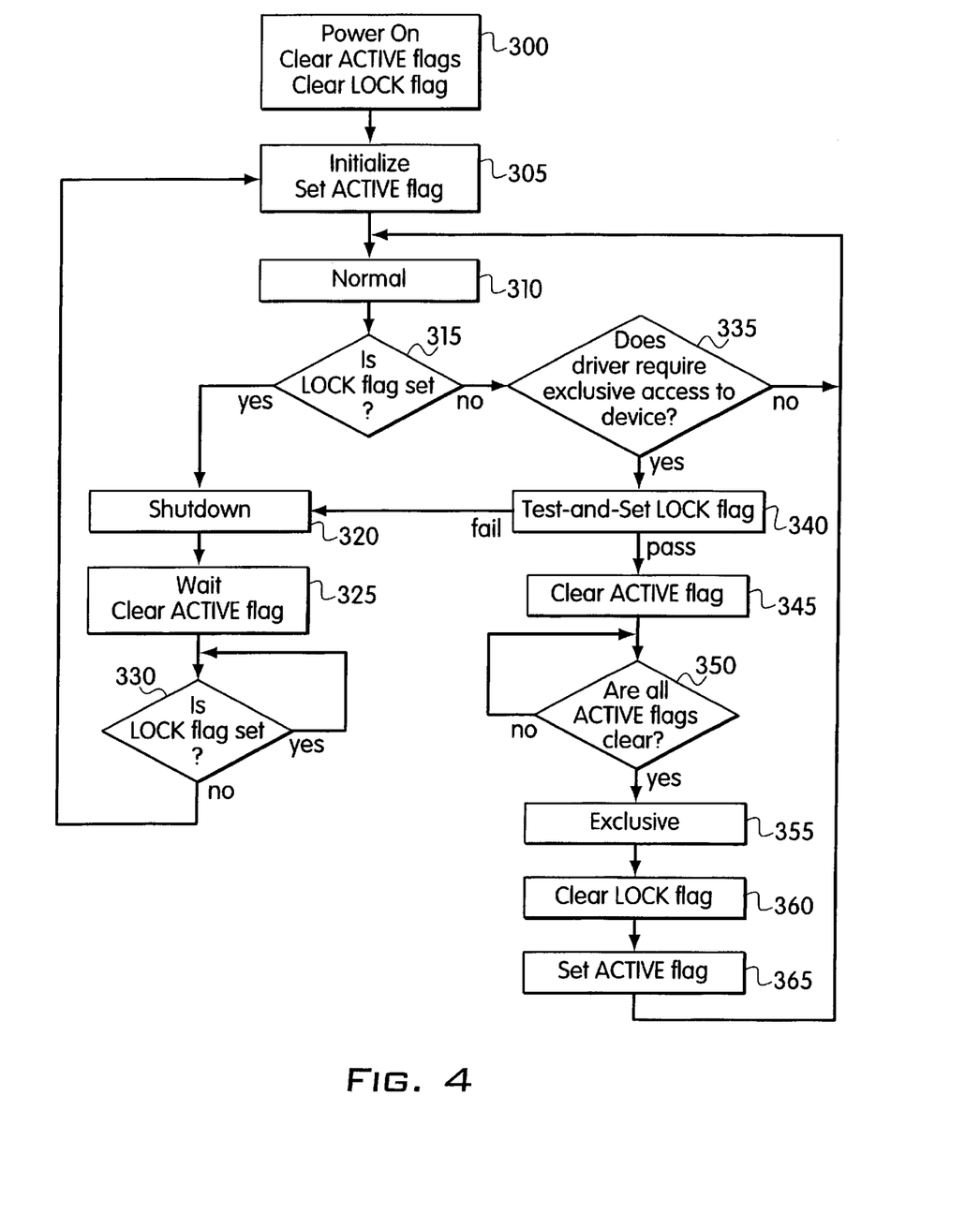
FIG. 4 shows an exemplary process flow for a device driver operating according to the present invention.

FIG. 4 shows an exemplary process flow for a device driver operating according to the present invention. The process flow shown in FIG. 4 is for a single device driver, but the process flow for each device driver is the same. For example, in a system as shown in FIG. 3, device driver A 210, device driver B 220, and device driver C 230 would follow the same exemplary process flow. In the first step 300, the system power is turned on and all flags are cleared, i.e., the device driver ACTIVE flags and the multifunction device LOCK flag. After power on, the process proceeds to step 305 where the device driver is initialized and it sets its ACTIVE flag in the extrinsic arbiter signaling it is ready to begin accessing the multifunction device. After initialization the process proceeds to step 310, the normal state, where the device driver may access the multifunction device. For example, if in FIG. 3, multifunction device 240 is a Modem/ISDN/WAN device and device driver A 210 is the serial port modem driver in the normal state, the ACTIVE flag of the serial port modem driver (device driver A 210) is set and computer system 200 may direct multifunction device 240 through the serial port modem driver (device driver A 210) to send and receive modem data. Similarly, if the other device drivers 220 and 230 are in the normal state, computer system 200 may also access multifunction device 240 to perform the functions corresponding to these device drivers.

Step 315 shows that during the normal state the device driver may query the extrinsic arbiter to determine if the LOCK flag of the multifunction device is set. Those skilled in the art will understand that the frequency of the query may depend on the character of the individual multifunction device. The LOCK flag of the multifunction device may be set if one of the device drivers requires exclusive access to the multifunction device. If the device driver determines that the LOCK flag of the multifunction device is set (by another device driver), the process proceeds to step 320, the shutdown state, where the device driver finishes any device operations that are critical and discontinues accessing the device. An operation is considered critical to the device driver if it is necessary to maintain overall system integrity. For example, ensuring that the device driver can resume the normal state after entering the wait state, described in greater detail below, is critical. Another example of a critical operation is ensuring that no other software or hardware component of the system is left in an illegal state. Additionally, the present invention allows a device driver developer to define a critical operation for a particular multifunction device based on the subjective requirements of each individual multifunction device. For example, a multifunction device may have a particular shutdown sequence that allows for the most efficient operation of the device. A developer, in writing the device driver software, may incorporate this shutdown sequence as a critical operation. Thus, during the shutdown state, the device driver may instruct the multifunction device to perform this critical shutdown sequence. Such cases are subjective and left to the developer to determine the exact implementation, because as described above, the arbitration mechanism of the present invention can be implemented without regard to the multifunction device or the individual device drivers.

When shutdown is complete, the device driver transitions to the wait state in step 325 where the ACTIVE flag for the device driver is cleared. All device drivers that did not set the LOCK flag enter the shutdown state and the wait state, so that the device driver that set the LOCK flag may have exclusive access to the multifunction device. When all the ACTIVE flags are cleared, the device driver that locked the multifunction device may enter its state of exclusivity with the multifunction device. The process with respect to the device driver that set the LOCK flag of the multifunction device is described in greater detail below. After the ACTIVE flag is cleared in step 325, the device driver proceeds to step 330 where it queries the extrinsic arbiter to determine if the LOCK flag of the multifunction device remains set. If the LOCK flag remains set, the process loops and continues to query the extrinsic arbiter. When the LOCK flag is cleared, the process returns to step 305 to initialize the device driver by setting the ACTIVE flag and then returns to the normal state in step 310 so the device driver may access the multifunction device.

If in step 315, the device driver determines that the LOCK flag of the multifunction device is clear, the process proceeds to step 335 to determine whether this device driver requires exclusive access to the multifunction device. If the device driver does not require exclusive access to the multifunction device, the process loops back to step 315 to continue querying the extrinsic arbiter to determine if the LOCK flag of the multifunction device is set. As described above, step 315 is performed during the normal state of the device driver. Thus, if the LOCK flag of the multifunction device is clear, the device driver may access the multifunction device during this querying step. If in step 335, the device driver determines that it requires exclusive access to the multifunction device, the process proceeds to step 340 where a "Test-and-Set" operation is performed on the LOCK flag of the multifunction device in the extrinsic arbiter. The Test-and-Set operation ensures that the LOCK flag is clear. If the LOCK flag is clear, the device driver requiring exclusive access to the multifunction device sets the LOCK flag of the multifunction device and a pass condition exists. In the pass condition, the process is allowed to proceed to step 345. If the Test-and-Set operation of step 340 determines that the LOCK flag is not clear, a fail condition exists, and the process proceeds to step 320 so the device driver can enter the shutdown state. A failure of the Test-and-Set operation of step 340 indicates that a different device driver has set the LOCK flag, while the current driver was performing step 335.

An example of when a device driver requires exclusive access to the multifunction device may be when the device driver runs a diagnostic test on the multifunction device. For example, with reference to FIG. 3, computer system 200 may detect an error with function A of multifunction device 240 and require device driver A 210 to run a diagnostic test on multifunction device 240. The commands sent by device driver A 210 for running a diagnostic test on multifunction device 240, e.g., temporarily removing power, purging memory, etc., may cause the other functions of multifunction device 240 to fail. Thus, to run a diagnostic test without causing other functions to fail, device driver A 210 requires exclusive access to multifunction device 240. Those skilled in the art will understand that there are numerous scenarios that require a device driver to have exclusive access to a multifunction device and that the present invention may be implemented independent of any scenario requiring exclusive access.

The process then proceeds to step 345 where the device driver that set the LOCK flag clears its ACTIVE flag. The ACTIVE flag of the device driver that set the LOCK flag of the multifunction device may remain set, but in this exemplary process the ACTIVE flag is cleared to be consistent with the states of other device driver ACTIVE flags during the period of exclusivity. The process then proceeds to step 350 where the device driver that set the LOCK flag checks the ACTIVE flags of all the other device drivers to determine if they are clear. As described above, each device driver may read the ACTIVE flags of all the other device drivers in the extrinsic arbiter to determine if they are set or clear. Also as described above with respect to steps 315–325, when the LOCK flag of the multifunction device is set, the device drivers that did not set the LOCK flag will shutdown and enter the wait state where the ACTIVE flags of these device drivers are cleared. If in step 350, the ACTIVE flags of the device drivers that did not set the LOCK flag are not all clear, the process will loop until all the ACTIVE flags are clear. When the device driver that set the LOCK flag determines in step 350 that all the ACTIVE flags are clear, the process proceeds to step 355 where the device driver enters the exclusive state. While in the exclusive state, the device driver has exclusive access to the multifunction device and may proceed to send commands to the multifunction device without disturbing any other operations or functions of the multifunction device.

When the device driver is finished performing all the functions for which it requires exclusive access to the multifunction device, the process proceeds to step 360 where the device driver clears the LOCK flag for the multifunction device in the extrinsic arbiter. As described above with reference to step 330, the device drivers that did not set the LOCK flag will determine that the LOCK flag has cleared so that these device drivers may reenter the normal state. The process then proceeds to step 365 where the device driver sets its ACTIVE flag and then returns to the normal state in step 310 where any device driver may access the multifunction device. Also as described above, it is not necessary to clear the ACTIVE flag of the device driver that set the LOCK flag. If the ACTIVE flag of the device driver that set the LOCK flag is not cleared in step 345, it is not necessary to set the ACTIVE flag in step 365.

Figure 5:
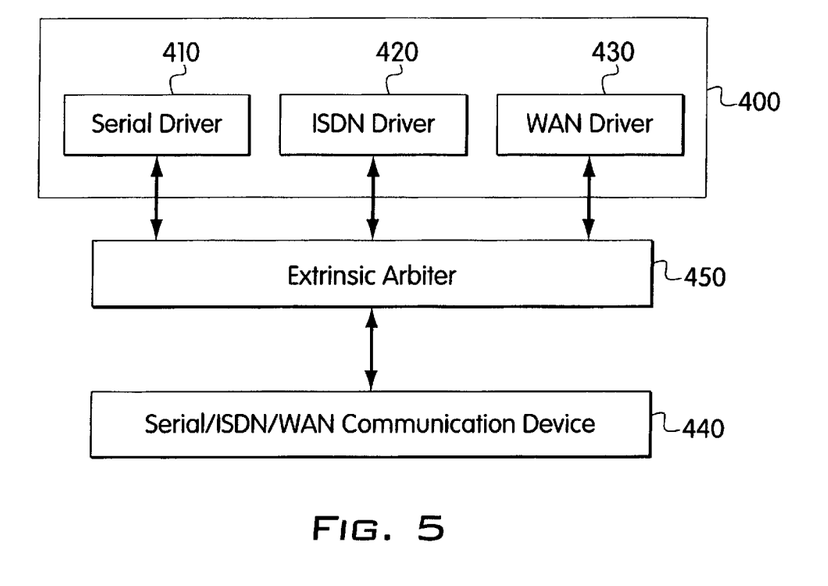
FIG. 5 shows an exemplary embodiment of a computer system with a multifunction communication device, multiple communication device drivers and an extrinsic arbiter according to the present invention.

FIG. 5 shows an exemplary embodiment of the present invention as applied to a computer system 400 having a serial port driver 410, an ISDN communication driver 420 and a WAN communication driver 430, connected through an extrinsic arbiter 450 to a Modem/ISDN/WAN communication device 440. In this exemplary embodiment extrinsic arbiter 450 and Modem/ISDN/WAN communication device 440 are shown as contained in the same hardware case as computer system 400. Extrinsic arbiter 450 may be a hardware device plugged into the system bus architecture or software code contained in memory, e.g., RAM. Modem/ISDN/WAN communication device 440 may be a PC card containing the described functions that is plugged into the bus architecture of the system. According to the present invention, extrinsic arbiter 450 assigns an ACTIVE flag to each of serial port driver 410, ISDN communication driver 420 and WAN communication driver 430 and a LOCK flag to Modem/ISDN/WAN communication device 440. After each of the device drivers 410, 420, 430 are initialized by setting their ACTIVE flags, they enter the normal state where any of the device drivers 410, 420, 430 may access Modem/ISDN/WAN communication device 440. In the normal state, computer system 400 may direct the Modem/ISDN/WAN communication device 440 through serial port driver 410 to transmit information via a modem. While this transmission is occurring, there may be computer system software application that determines that the WAN device must be reconfigured. Computer system 400 may determine that reconfiguring the WAN device takes precedent over the outgoing transmission on the serial port modem of Modem/ISDN/WAN communication device 440 and direct WAN communication driver 430 to issue commands to Modem/ISDN/WAN communication device 440 to reconfigure the WAN device.

WAN communication driver 430 may determine that in order to reconfigure the WAN device portion of the Modem/ISDN/WAN communication device 440 it requires exclusive access to Modem/ISDN/WAN communication device 440. WAN communication driver 430 may set the LOCK flag of Modem/ISDN/WAN communication device 440 in extrinsic arbiter 450. Serial port driver 410 will then direct Modem/ISDN/WAN communication device 440 to shutdown the modem connection and perform any remaining critical operations, discontinue accessing Modem/ISDN/WAN communication device 440, and clears its ACTIVE flag in extrinsic arbiter 450. Similarly, ISDN communication driver 420 will direct Modem/ISDN/WAN communication device 440 to perform any remaining critical operations, discontinue accessing Modem/ISDN/WAN communication device 440, and clear its ACTIVE flag in extrinsic arbiter 450. When WAN communication driver 430 determines that all the ACTIVE flags are clear, by reading extrinsic arbiter 450, WAN communications driver 430 has exclusive access to issue commands to reconfigure the WAN device of Modem/ISDN/WAN communication device 440. When WAN communication driver 430 no longer requires exclusive access to Modem/ISDN/WAN communication device 440, the LOCK flag in extrinsic arbiter 450 is cleared. After the LOCK flag is clear, each of serial port driver 410, ISDN communication driver 420 and WAN communication driver 430 reenter the normal state where any device driver can access the Modem/ISDN/WAN communication device 440.

Figure 6:
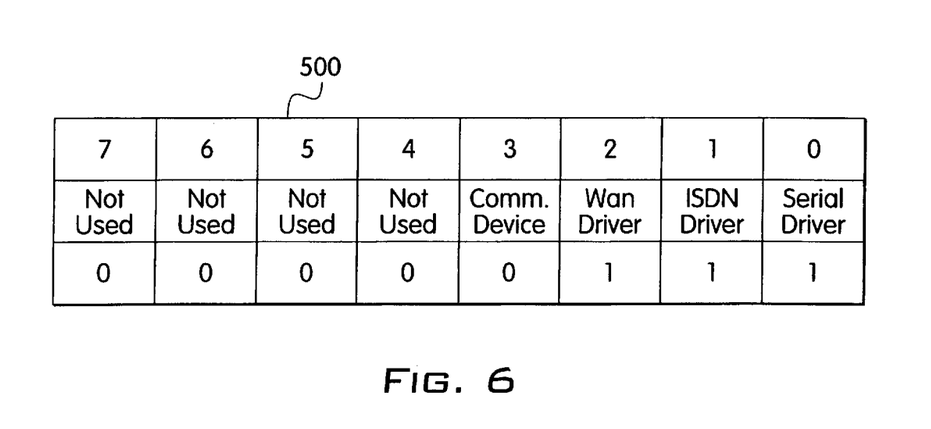
FIG. 6 shows an exemplary embodiment of a register used to implement an extrinsic arbiter according to the present invention.

FIG. 6 shows an example of an 8-bit register 500 that may be used to implement extrinsic arbiter 450 of FIG. 5. Register 500 has bits 0–7, where bit 0 is the ACTIVE flag of serial port modem driver 410, bit 1 is the ACTIVE flag of ISDN communication driver 420, bit 2 is the ACTIVE flag of WAN communication driver 430, bit 3 is the LOCK flag of Modem/ISDN/WAN multifunction device 440, and bits 4–7 are unused. In the example of FIG. 6, bit 0 has a value of 1 indicating that the ACTIVE flag of serial port modem driver 410 is set, bit 1 has a value of 1 indicating that the ACTIVE flag of ISDN communication driver 420 is set, bit 2 has a value of 1 indicating that the ACTIVE flag of WAN communication driver 430 is set, and bit 3 has a value of 0 indicating that the LOCK flag of Modem/ISDN/WAN communication device 440 is clear. These settings indicate that each of the device drivers 410, 420, 430 are in the normal state where any device driver may access the Modem/ISDN/WAN communication device 440 because the LOCK flag of Modem/ISDN/WAN communication device 440 is clear.

Figure 7:
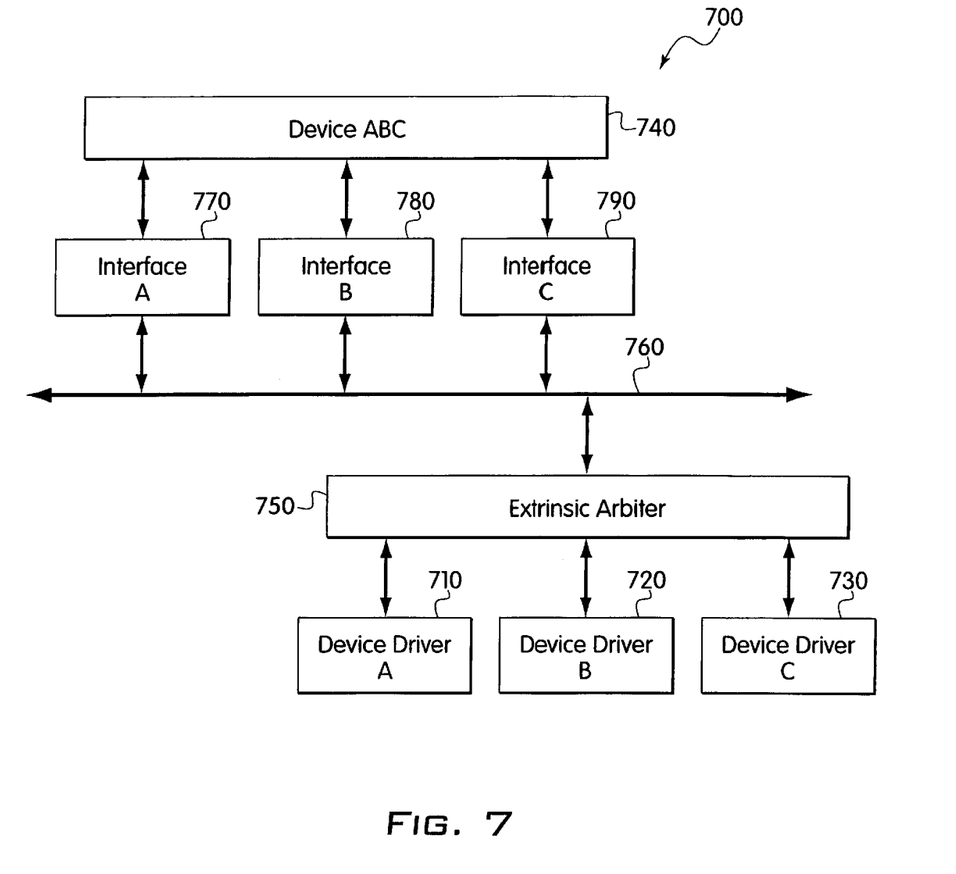
FIG. 7 shows an exemplary embodiment of a computer system implementing multiple bus interfaces to a multifunction device according to the present invention.

FIG. 7 shows an exemplary embodiment of the present invention in system 700 where multifunction device 740 is connected to host system bus architecture 760 through interfaces 770–790. Device Drivers 710–730 are also connected to host system bus architecture 760 through extrinsic arbiter 750. Interfaces 770–790 and device drivers 710–730 correspond to a function performed by multifunction device 740, i.e., Device Driver A 710 and Interface A 770 correspond to function A of multifunction device 740, Device Driver B 720 and Interface B 780 correspond to function B of multifunction device 740, and Device Driver C 730 and Interface C 790 correspond to function C of multifunction device 740. System 700 matches the interfaces to the corresponding device drivers, as will be described in greater detail below. Those skilled in the art will understand that the arrangement shown in FIG. 7 is only exemplary and the components may be arranged in various manners within system 700. For example, extrinsic arbiter 750 may be arranged on the other side of host system bus architecture 760, i.e., between host system bus architecture 760 and interfaces 770–790.

The operation of system 700 will be described for a PCI system bus architecture, but those skilled in the art will understand that the present invention can be applied to any system bus architecture. In a PCI system bus architecture, each interface 770–790 contains configuration registers that define the device to the PCI bus system. The configuration registers contained in each interface 770–790 include a Vendor ID register (VID), a Device type ID register (DID), and a Base Address Register (BAR). When system 700 is first powered on it scans host system bus architecture 760 for interfaces 770–790. For each interface found, system 700 reads the VID and DID registers to determine the vendor and type of device. The device type informs system 700 as to which type of device drivers 710–730 to load and where these device drivers belong functionally in system 700. By determining the vendor of multifunction device 740 and its associated functions, system 700 can determine the correct device drivers for that vendor's device. If the vendor does not supply a driver, then system 700 will attempt to use a "default" device driver. Prior to allowing device drivers 710–730 to communicate with multifunction device 740, system 700 assigns an address to each function that uniquely identifies the function. In a PCI system, for example, the unique address is stored in the BAR register. This unique address is also provided to device drivers 710–730 so that they may begin accessing multifunction device 740. This process is repeated for each interface that system 700 finds on host system bus architecture 760. Therefore, after the configuration process, Interface A 770 is assigned to device driver A 710, Interface B 780 is assigned to device driver B 720, and Interface C 790 is assigned to device driver C 730. As a result, multifunction device 740 appears to system 700 as three independent devices, corresponding to the three functions of multifunction device 740. Thus, it is possible to maintain separate device drivers 710–730 when using multifunction device 740 in a system 700 having host system bus architecture 760. Each of interfaces 770–790 is accessible individually from both host system bus architecture 760 and multifunction device 740.

Other Embodiments: While the present invention has been particularly shown and described with reference to an exemplary embodiment thereof, it will be understood by those skilled in the art that various changes in form and details may be made therein without departing from the spirit and scope of the invention.

What is claimed is:

1. A computer system for controlling the operation of a multifunction device, comprising:

a central processing unit;

a memory device connected to the central processing unit;

a plurality of device drivers, wherein each of the plurality of device drivers issues commands to control the multifunction device; and an arbitration mechanism connected to the plurality of device drivers and further connected to the multifunction device, wherein commands issued by the plurality of device drivers are received by the arbitration mechanism, and wherein the arbitration mechanism determines a sequence for the commands to be issued to the multifunction device.

2. The computer system of claim 1, wherein the plurality of device drivers are stored in the memory device.

3. The computer system of claim 1, wherein the arbitration mechanism is stored in the memory device.

4. The computer system of claim 1, wherein the multifunction device performs a plurality of functions, and wherein the arbitration mechanism determines the sequence of commands extrinsic to the plurality of functions.

5. The computer system of claim 1, wherein the central processing unit directs each of the plurality of device drivers to issue commands to control the multifunction device.

6. The computer system of claim 1, wherein the arbitration mechanism includes a flag corresponding to each of the plurality of device drivers and the multifunction device, wherein each of the plurality of the device drivers sets the corresponding flag in the arbitration mechanism indicating when each of the plurality of device drivers is ready to issue commands to the multifunction device, and wherein one of the plurality of device drivers sets the flag corresponding to the multifunction device when the one of the plurality of device drivers requires exclusive access to the multifunction device to issue commands.

7. The computer system of claim 6, wherein the sequence of commands includes only commands issued by the one of the plurality of device drivers when the flag corresponding to the multifunction device is set.

8. The computer system of claim 1, further comprising:

a system bus architecture; and a plurality of bus architecture interfaces corresponding to the plurality of device drivers, wherein the plurality of bus architecture interfaces communicates the commands issued by the plurality of device drivers to the multifunction device.

9. The computer system of claim 8, wherein the system bus architecture is a Peripheral Component Interconnect architecture.

10. The computer system of claim 1, wherein the arbitration mechanism includes a register.

11. An arbitration mechanism connected to a computer system and further connected to a multifunction device, wherein the computer system includes a plurality of device drivers for issuing commands to control the multifunction device, the arbitration mechanism comprising:
- an ACTIVE flag corresponding to each of the plurality of device drivers, wherein each of the plurality of device drivers sets the corresponding ACTIVE flag to a set state when the device driver is ready to issue commands to control the multifunction device, and wherein each of the plurality of device drivers sets the corresponding ACTIVE flag to a clear state when the device driver is not ready to issue commands to control the multifunction device; and
- a LOCK flag corresponding to the multifunction device, wherein one of the plurality of device drivers sets the LOCK flag to a set state when the one of the plurality of device drivers requires exclusive access to the multifunction device.

12. The arbitration mechanism of claim 11, wherein when the one of the plurality of device drivers sets the LOCK flag to the set state, each of the plurality of device drivers set the corresponding ACTIVE flag to a clear state, and wherein the one of the plurality of device drivers queries the ACTIVE flags of the plurality of device drivers to determine when each of the ACTIVE flags are in the clear state.

13. The arbitration mechanism of claim 12, wherein the one of the plurality of device drivers accesses the multifunction device when each of the ACTIVE flags are in the clear state.

14. The arbitration mechanism of claim 12, wherein the one of the plurality of device drivers sets the LOCK flag to a clear state when the one of the plurality of device drivers is finished exclusively accessing the multifunction device.

15. The arbitration mechanism of claim 14, wherein each of the plurality of device drivers queries the LOCK flag of the multifunction device to determine when the LOCK flag is in the clear state, and wherein each of the plurality of device drivers sets the corresponding ACTIVE flag to the set state when the LOCK flag is in the clear state.

16. The arbitration mechanism of claim 11, wherein the ACTIVE flags and LOCK flag are implemented in hardware.

17. A method for arbitrating commands issued by at least two device drivers in a computer system to a multifunction device, comprising the steps of:
- determining when one of the at least two device drivers requires exclusive access to the multifunction device;
- restricting access to the multifunction device to the other one of the at least two device drivers; and
- granting exclusive access to the multifunction device to the one of the at least two device drivers.

18. The method according to claim 17, further comprising the step of:
- granting access to the multifunction device to the at least two device drivers when the one of the least two device drivers does not require exclusive access.

19. A method for controlling a device performing a plurality of functions connected to a computer system, comprising the steps of:
- providing a plurality of device drivers for sending commands to the device, wherein each of the plurality of device drivers corresponds to one of the plurality of functions performed by the device;
- assigning an ACTIVE flag to each of the plurality of device drivers, wherein each of the ACTIVE flags has a set state and a clear state;
- setting the ACTIVE flag assigned to at least one of the plurality of device drivers to the set state when the at least one of the plurality of device drivers is ready to use the device; and
- allowing each of the plurality of device drivers for which the ACTIVE flag is in the set state to send commands to the device to control the corresponding one of the plurality of functions.

20. The method according to claim 19, wherein the computer system determines when the at least one of the device drivers is ready to use the multifunction device.

21. The method according to claim 19, further comprising the step of:
- setting the ACTIVE flag of the at least one of the plurality of device drivers to the clear state when the at least one of the plurality of device drivers is not ready to use the device.

22. The method according to claim 19, further comprising the steps of:
- assigning a LOCK flag to the device, wherein the LOCK flag has a set state and a clear state;
- permitting one of the plurality of device drivers to set the LOCK flag of the device to the set state when the one of the plurality of device drivers requires exclusive access to the device;
- requiring each of the plurality of device drivers which did not set the LOCK flag of the device to the set state to discontinue sending commands to the device;
- setting the ACTIVE flag of each of the plurality of device drivers to the clear state; and
- allowing only the one of the plurality of device drivers that set the LOCK flag to send commands to the device.

23. The method according to claim 22, further comprising the step of:
- permitting only the one of the plurality of device drivers that set the LOCK flag to reset the LOCK flag to the clear state.

24. The method according to claim 22, further comprising the step of:
- permitting each of the plurality of device drivers which did not set the LOCK flag of the device to the set state to send critical commands to the device prior to discontinuing sending commands to the device, wherein the critical commands are necessary to maintain integrity of the computer system.

25. A computer system for controlling the operation of a multifunction device, comprising:
- a plurality of device drivers, wherein each of the plurality of device drivers issues commands to control the multifunction device;
- a plurality of interfaces corresponding to the plurality of device drivers, wherein the plurality of interfaces communicates commands issued by the plurality of device drivers to the multifunction device;
- an arbitration mechanism connected to the plurality of device drivers and further connected to the plurality of interfaces, wherein commands issued by the plurality of device drivers are received by the arbitration mechanism, and wherein the arbitration mechanism determines a sequence for the commands to be issued to the multifunction device.

26. The computer system according to claim 25, wherein each of the plurality of interfaces is accessible individually via a system bus.

* * * * *